(12) United States Patent
Bernard

(10) Patent No.: US 6,832,520 B2
(45) Date of Patent: Dec. 21, 2004

(54) FLOATING-PROBE FLOWMETER

(75) Inventor: Heinz Bernard, Duisburg (DE)

(73) Assignee: Krohne Messtechnik GmbH & Co. KG, Duisburg (DE)

(*) Notice: Subject to any disclaimer, the term of this patent is extended or adjusted under 35 U.S.C. 154(b) by 0 days.

(21) Appl. No.: 10/691,063

(22) Filed: Oct. 22, 2003

(65) Prior Publication Data
US 2004/0089077 A1 May 13, 2004

(30) Foreign Application Priority Data
Nov. 13, 2002 (DE) .......................... 102 53 086

(51) Int. Cl.[7] .............................................. G01F 1/22
(52) U.S. Cl. .................................................. 73/561.57
(58) Field of Search ........................ 73/861.57, 861.58, 73/861.56

(56) References Cited

U.S. PATENT DOCUMENTS 4,699,617 A * 10/1987 Moriuchi et al. ........... 604/246
6,470,758 B1 * 10/2002 Bernard et al. .......... 73/861.51

FOREIGN PATENT DOCUMENTS

DE 100 53 829 A1 5/2002
GB 2 085 598 A 4/1982

OTHER PUBLICATIONS

Dettner, Dr. Heinz W., Lexikon fur MetalloberflackenVeredlung, Germany, 1989, pp. 154–155.

* cited by examiner

Primary Examiner—Edward Lefkowitz
Assistant Examiner—Jewel V. Thompson
(74) Attorney, Agent, or Firm—Cesari and McKenna, LLP

(57) ABSTRACT

A floating-probe flowmeter for measuring the flow rate of a moving medium includes a measuring tube through which flows a medium against the force of gravity and a float capable of moving at least in the direction of the medium flow. The surface of the float that is exposed to the flow of the medium and/or the inner surface of the measuring tube at least in the area of movement of the float is/are provided with a microstructure designed to virtually eliminate the effect of the viscosity of the flowing medium on the lift of the float.

5 Claims, 1 Drawing Sheet

FLOATING-PROBE FLOWMETER

This invention relates to a floating-probe flowmeter for measuring the flow of a moving medium, with a measuring tube through which the medium travels against the force of gravity and which measuring tube contains a float that is capable of moving at least in the direction of the flow.

BACKGROUND OF THE INVENTION

1. Field of the Invention

Floating-probe flowmeters of the type referred to above have for years been used for determining volume flow rates through closed pipelines, and due to their simplicity and ruggedness they have met with broad appeal especially in the chemical industry and in process engineering but also in the realm of medicine and the natural sciences. In its simplest implementation, a conventional floating-probe flowmeter consists of a flared measuring tube and a float that is suitably designed as a probe capable of moving freely at least in the direction of the flow. The medium whose flow rate is to be measured flows against the force of gravity, i.e. essentially in an upward direction.

The combination of measuring tube and float thus constitutes a throttle-type flow regulator. The density of the float is greater than that of the medium flowing through the measuring tube. As a function of the flow rate the float, once settled, is suspended at a particular level within the measuring tube, which level is determined by the equilibrium between the hydrodynamic force generated by the flow and transferred to the float and the differential force between the weight and the buoyancy of the float. That suspended position of the float, also referred to as its lift, is read out by the observer either directly off a scale on a transparent measuring tube, or it is signaled via a coupling device such as a magnetic coupling to an external gauge and/or to an electrical transducer.

Apart from the volume flow it is also the viscosity of the moving medium that plays a significant role in determining the lift of the float. It follows that the floating-probe flowmeter will always have to be calibrated for a particular medium of a specific predefined viscosity. But it also means that whenever the viscosity of a flowing medium fluctuates or another medium with a different viscosity is measured, the floating-probe flowmeter will no longer work properly, i.e. it usually fails to provide the correct volume flow readings.

Specifically, too, the viscosity of the flowing medium produces a boundary layer on the surface of the float facing the flow of the medium. At the interface of that boundary layer the float is exposed to shearing and friction forces that significantly affect the lift of the float.

2. Description of the Prior Art

In an effort to at least reduce the effect of viscosity on the lift of the float, the floats of conventional floating-probe flowmeters have frequently been provided with a spoiler-type flow-breaking edge intended to deflect the flow away from the surface of the float, again to at least diminish the effect of the viscosity on the lift of the float. Solutions of that nature by means of a breaking edge have some functional merit, but the attainable reduction in the formation of a boundary layer is minor, generally making it unavoidable that behind the breaking edge the flow reconverges to hug the float, thus forming a new boundary layer. Finally, viscosity-related effects on the inner surface of the measuring tube also appear to affect the lift of the float.

SUMMARY OF THE INVENTION

It is, therefore, the objective of this invention to introduce a floating-probe flowmeter in which the lift of the float remains essentially unaffected by the viscosity of the flowing medium.

In a floating-probe flowmeter as described above, this objective is achieved in that at least the surface of the float that is exposed to the flow of the medium is provided with a microstructure and/or that the inner surface of the measuring tube at least in the area of float movement is provided with a microstructure.

This means that, according to the invention, the surface of the float that is exposed to the flow of the medium and/or the inner surface of the measuring tube should not be "smooth" in the traditional sense but should intentionally be given a certain textured roughness in the micron range. Such texture can be obtained for instance by providing the surface of the float that is exposed to the flow of the medium and/or the inner surface of the measuring tube with a "peak-and-valley" microstructure with numerous peaks separated by corresponding valleys.

Preferably, the peaks of the microstructure are between 5 and 400 $\mu$m and ideally between 5 and 100 $\mu$m high, while the apex-to-apex distance between neighboring peaks is between 5 and 800 $\mu$m and ideally between 5 and 200 $\mu$m. In this case, the height and spacing of the peaks across the entire surface of the float that is exposed to the flow of the medium and across the entire inner surface of the measuring tube may be anywhere within the ranges indicated so that these surfaces may feature very low and very high peaks with very small as well as very large spaces between these peaks. In a preferred embodiment of the invention, however, neighboring peaks are roughly identical in height while the interapical distance between neighboring peaks measures about 1 to 2 times the height of the peaks.

The float may consist of practically any material. In a preferred embodiment of the invention, however, the peaks of the microstructure are rendered hydrophobic. A float with a microstructure of hydrophobic peaks ensures not only the aforementioned avoidance of the formation of a boundary layer and thus an avoidance, or at least a reduction of the effect, of the flowing medium's viscosity on the lift of the float, but also a certain cleaning action, i.e. contaminants carried by the medium and adhering to the float are easily removed from the hydrophobic surface by the constant scavenging action of the medium.

This cleansing effect can also be utilized on all other surfaces of the floating-probe flowmeter that make contact with the flowing medium, most particularly the inner surface of the measuring tube at least in the area of movement of the float. Therefore, in a preferred embodiment of the invention, the inner surface of the measuring tube at least in the area of movement of the float is provided with a microstructure of hydrophobic peaks for producing the aforementioned cleansing effect.

There are numerous ways in which the floating-probe flowmeter according to this invention can be configured and further enhanced. In that context, attention is invited to the dependent claims and to the following detailed description of preferred embodiments of the invention with reference to the attached drawings.

DETAILED DESCRIPTION OF AN ILLUSTRATIVE EMBODIMENT

Figure 1:
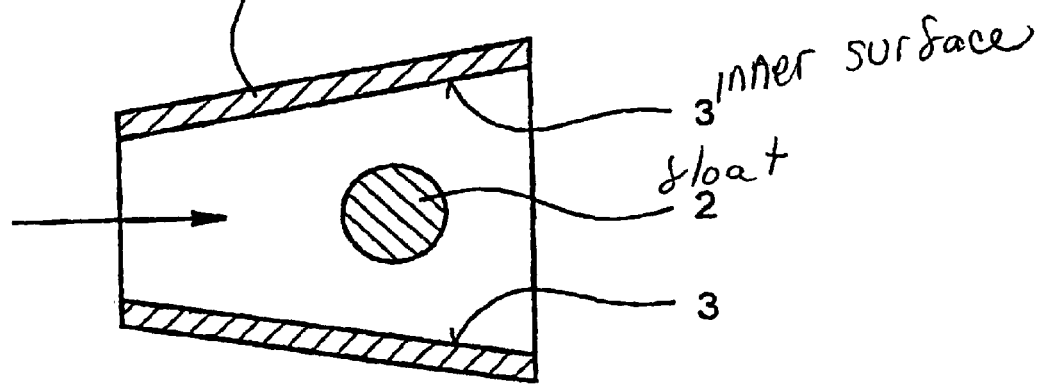
FIG. 1 is a schematic sectional illustration of a floating-probe flowmeter according to a preferred embodiment of the invention.

The floating-probe flowmeter according to a preferred implementation example of this invention as sectionally illustrated in FIG. 1 comprises a measuring tube 1 through which flows a medium, not shown, in an upward direction against the force of gravity as indicated by the arrow. The measuring tube 1 is flared in the upward direction. Freely moving inside the measuring tube 1 is a float 2, which in conjunction with the measuring tube 1 forms a throttle valve for the flowing medium.

The density of the float 2 is greater than the density of the medium passing through the measuring tube 1. The current of the medium creates forces that bear on the float 2, causing it to rise and settle at a particular level within the measuring tube 1 that is a function of the flow rate of the medium through the measuring tube 1 and, in turn, of the resulting equilibrium between the hydrodynamic force generated by that current and transferred to the float 2 and the differential force between the weight and the buoyancy of the float 2.

Apart from the volume flow, it is also the viscosity of the moving medium that plays a role in determining the level, i.e. the lift, of the float 2 in conventional floating-probe flowmeters. In the preferred embodiment of the floating-probe flowmeter according to the invention, that effect of the viscosity on the lift is essentially eliminated by virtue of the fact that the entire surface of the float 2 is provided with a microstructure. Specifically, the float 2 in the preferred implementation embodiment of the invention is a sphere whose entire surface features micro-peaks about 50 $\mu$m high and with an apex-to-apex spacing of about 100 $\mu$m. These micro-peaks essentially prevent the formation of a boundary layer of the flow on the float 2, so that the shear and frictional forces induced by the viscosity of the flowing medium and bearing on the float 2 have essentially no effect on the lift of the float 2. It follows that an essentially complete avoidance of the viscosity problem discussed above is attainable by means of a float 2 of a simple, namely spherical design that does not require a flow-breaking edge.

Apart from the float 2 in the floating-probe flowmeter according to the preferred embodiment of the invention, the inner surface 3 of the measuring tube 1 as well is provided with a microstructured texture at least in the area of movement of the float 2, with the textural dimensions of the microstructure on the inner surface 3 essentially corresponding to those of the microstructure on the surface of the float 2, but with the peaks additionally having hydrophobic characteristics. Of course, the peaks in the microstructure on the surface of the float 2 may also be made hydrophobic so that there as well the benefits of the cleansing effect can be realized.

Hydrophobic peaks can be produced for instance by coating the surface of the float 2 and the inner surface of the measuring tube 1 with suitable polymers such as polytetrafluoroethylene (PTFE). The microstructure itself on the surface of the float 2 and on the inner surface 3 of the measuring tube 1 can be produced for instance by stamping or embossing, by applying an appropriately fine-grained material or by high-energy ion bombardment (sputtering).

Figure 2:
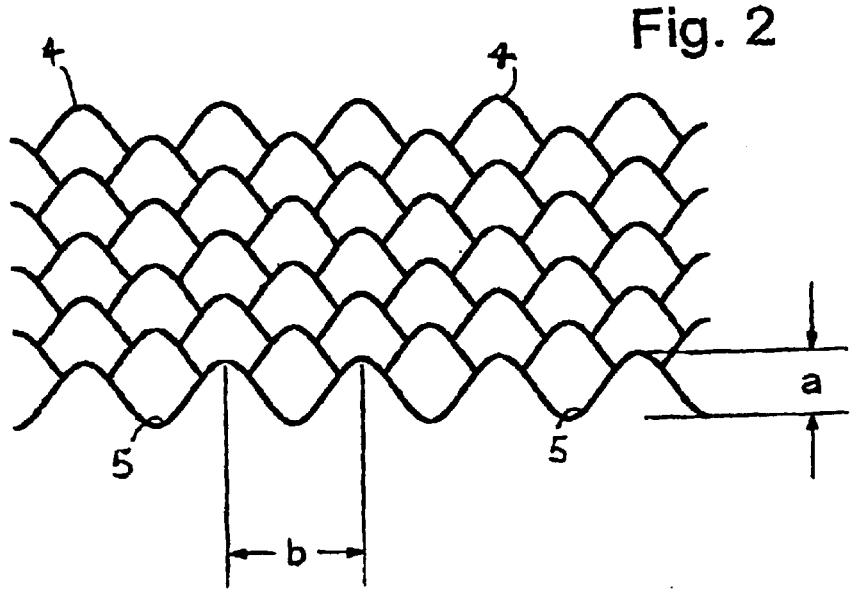
FIG. 2 depicts diagrammatically the texture of a microstructured surface in a preferred embodiment of the invention.

FIG. 2 shows how a microstructured surface according to one preferred embodiment of the invention might look. It illustrates a uniform array of peaks 4 and, separating these, valleys 5, with the height of the peaks 4 being about 50 $\mu$m and the distance b between the apices of the peaks 4 being roughly twice the height at 100 $\mu$m. Of course, as explained further above, a pattern as uniform as that in FIG. 2 is not absolutely necessary for obtaining the effect discussed. Instead, full-range utilization, for instance, of an especially preferred height range of 5 to 100 $\mu$m and an especially preferred inter-apex spacing range from 5 to 200 $\mu$m is possible over the entire surface.

What is claimed is:

1. A floating-probe flowmeter for measuring the flow rate of a moving medium, with a measuring tube through which flows a medium against the force of gravity, said measuring tube containing a float capable of moving at least in the direction of the flow, wherein at least the surface of the float that is exposed to the flow of the medium is provided with a microstructure comprising a field of peaks and/or that the inner surface of the measuring tube at least in the area of movement of the float is provided with a microstructure comprising a field of peaks.

2. The floating-probe flowmeter as in claim 1, wherein the peaks of the microstructure are between 5 and 400 $\mu$m high and the apices of neighboring peaks are spaced apart by a distance of between 5 and 800 $\mu$m.

3. The floating-probe flowmeter as in claim 2, wherein neighboring peaks are of approximately equal height and the apices of neighboring peaks are spaced apart by a distance corresponding to about 1 to 2 times the height of the peaks.

4. The floating probe flowmeter as in claim 2, wherein the neighboring peaks are between 5 and 100 $\mu$m high and the apices of neighboring peaks are spaced apart by a distance of between 5 and 200 $\mu$m.

5. The floating-probe flowmeter as in one of the claims 1 to 3, wherein the peaks of said microstructure are hydrophobic.

* * * * *